(12) United States Patent
Nishioka

(10) Patent No.: US 8,158,715 B2
(45) Date of Patent: Apr. 17, 2012

(54) BINDER RESIN COMPOSITION

(75) Inventor: Tetsuji Nishioka, Hyogo (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 686 days.

(21) Appl. No.: 12/294,491

(22) PCT Filed: Apr. 5, 2006

(86) PCT No.: PCT/JP2006/307783
§ 371 (c)(1), (2), (4) Date: Sep. 25, 2008

(87) PCT Pub. No.: WO2007/113922
PCT Pub. Date: Oct. 11, 2007

(65) Prior Publication Data
US 2010/0227970 A1    Sep. 9, 2010

(51) Int. Cl.
*C08L 23/00* (2006.01)
*C08F 14/08* (2006.01)
(52) U.S. Cl. .................. 524/570; 525/239
(58) Field of Classification Search ............... 524/570; 525/239
See application file for complete search history.

(56) References Cited

U.S. PATENT DOCUMENTS

| | | | | |
|---|---|---|---|---|
| 7,019,080 B2 * | 3/2006 | Kashihara et al. | ............. | 525/240 |
| 2008/0188627 A1 * | 8/2008 | Menovcik et al. | ............. | 525/416 |

FOREIGN PATENT DOCUMENTS

| | | |
|---|---|---|
| EP | 1065245 A | 1/2001 |
| EP | 1 403 315 A1 * | 3/2004 |
| EP | 1403315 A | 3/2004 |
| EP | 1 469 035 A1 * | 10/2004 |
| EP | 1469035 A | 10/2004 |
| JP | 46-27489 | 8/1971 |
| JP | 50-35445 | 11/1975 |
| JP | 50-37688 | 12/1975 |
| JP | 63-36624 | 7/1988 |
| JP | 63-50381 | 10/1988 |
| JP | 05-112751 | 5/1993 |
| JP | 05-222320 | 8/1993 |
| JP | 06-306227 | 11/1994 |
| JP | 10-36601 | 2/1998 |
| JP | 2001-226545 | 8/2001 |
| JP | 2005-239983 | 9/2005 |
| WO | WO 03/002659 | 1/2003 |

OTHER PUBLICATIONS

Office Action issued on Aug. 22, 2011 in counterpart Chinese Application No. 200680054147.2 and its English translation.

\* cited by examiner

*Primary Examiner* — Robert D. Harlan
(74) *Attorney, Agent, or Firm* — Fish & Richardson P.C.

(57) ABSTRACT

A binder resin composition is provided which retains satisfactory low-temperature flowability and coating film performances and has a lower cost. A binder resin solution composition including: (a) a resin obtained by mixing a chlorinated polyolefin (I) obtained by chlorinating to a chlorine content of 10 to 40% by weight an isotactic polypropylene polymer produced in the presence of a metallocene catalyst, the isotactic polypropylene polymer having a molecular weight distribution of 3 or lower and a melting point as measured with a differential scanning calorimeter of 110 to 140° C.; with a carboxyl-containing chlorinated polyolefin (II) obtained by chlorinating to a chlorine content of 10 to 40% by weight a carboxyl-containing polyolefin obtained by grafting 1 to 10% by weight at least one unsaturated carboxylic acid monomer selected from a carboxylic acid and a carboxylic acid anhydride onto an isotactic polypropylene polymer produced with a titanium catalyst in a weight ratio (I)/(II) of from 5/95 to 50/50; and (b) an organic solvent, in which the composition has a solid concentration of 10 to 50% by weight.

16 Claims, No Drawings

BINDER RESIN COMPOSITION

TECHNICAL FIELD

The present invention relates to binder resin compositions which are suitably used for the purpose of the protection or decoration of polyolefin resins such as polypropylene, polyethylene, ethylene/propylene copolymers, and ethylene/propylene/diene copolymers. More particularly, the invention relates to binder resin solutions which are used as coating materials, primers, printing inks, or adhesives and which are excellent in adhesion to sheets, films, and moldings of those polymers and in solvent resistance and other properties, are excellent in adhesion and solvent resistance even when dried at a low temperature, and can be inexpensive.

BACKGROUND ART

In general, polyolefin resins are relatively inexpensive, have excellent performances such as chemical resistance, water resistance, and heat resistance, and are used in a wide range of fields as materials for automotive parts, electrical parts, building materials, food packages, etc. Although polyolefin resins have such features, it is difficult to coat or bond the resins because the resins are crystalline and nonpolar.

For the coating or bonding of such poorly bondable polyolefin resins, lowly chlorinated polyolefins showing high adhesion to polyolefin resins have been used as binder resins. A chlorinated isotactic polypropylene chlorinated to 20 to 40% by weight has been proposed as a binder resin for printing inks for polypropylene films (see, for example, patent document 1). A chlorinated propylene/ethylene copolymer chlorinated to 20 to 40% by weight has been proposed as a binder resin for printing inks or adhesives for polyolefins (see, for example, patent documents 2 and 3).

Furthermore, a lowly chlorinated propylene/α-olefin copolymer having a chlorine content of 5 to 50% by weight and containing a carboxylic acid and/or carboxylic acid anhydride has been proposed as a primer for the coating of polyolefin moldings or as a binder resin for the coating (see, for example, patent documents 4 and 5).

In general, the higher the chlorine contents of those chlorinated polyolefins becomes, the more the adhesion to polyolefins and the solvent resistance of the chlorinated polyolefins tend to become poor. It is therefore desirable to set the chlorine content at a value as low as possible. However, too low chlorine contents result in a poor solution state to cause a viscosity increase or gelation during storage. Such a chlorinated polyolefin hence considerably impairs workability, such as applicability by, e.g., spraying. Further, even when a lowly chlorinated polyolefin is regulated so as to have a chlorine content in a range where workability such as applicability by, e.g., spraying is not impaired, a solution of this chlorinated polyolefin, when stored at a low temperature, comes to have poor flowability and considerable limitations are imposed on the handling of the solution at low temperature in winter. Although reducing the concentration of such a lowly chlorinated polyolefin in solutions can improve low-temperature flowability, low concentrations result in difficulties in dispersing a pigment when an ink or coating material is prepared from the solution. Furthermore, low concentrations pose problems, for example, that transportation cost increases.

For mitigating such problems, a binder resin solution obtained by dissolving a lowly chlorinated polyolefin in a mixed solvent of an alicyclic hydrocarbon and an aromatic hydrocarbon has been proposed as a solution showing satisfactory low-temperature flowability (see, for example, patent document 6).

However, use of such a mixed solvent has a drawback that it necessitates a step in production to cause a cost increase. Furthermore, in case where that solution is used, for example, as part of a primer ingredient for coating and mixed with a dispersed resin, low-temperature flowability becomes poor because of the resultant change in solvent composition, etc. It is therefore difficult to consider that the binder resin solution is a fundamental resolution.

Patent Document 1 JP-B-46-27489
Patent Document 2 JP-B-50-35445
Patent Document 3 JP-B-50-37688
Patent Document 4 JP-B-63-50381
Patent Document 5 JP-B-63-36624
Patent Document 6 JP-A-6-306227

DISCLOSURE OF THE INVENTION

Problems that the Invention is to Solve

The present inventors found that a binder resin solution obtained by dissolving, in a solvent, a chlorinated polyolefin which has a chlorine content of 10 to 40% by weight and is obtained by chlorinating a polyolefin produced with a metallocene catalyst so as to result in a solid concentration of 10 to 50% by weight shows satisfactory low-temperature flowability and workability and has excellent adhesion to polyolefins and solvent resistance, as described in WO 03/2659. However, in order to satisfy extremely severe solvent resistance represented by gasohol resistance, modification with maleic anhydride is essential for this binder resin solution. This is disadvantageous from the standpoint of cost. Accordingly, an object of the invention is to provide a binder resin solution composition which is inexpensive while retaining high performances.

The present inventors have found that, when a chlorinated polyolefin having a chlorine content of 10 to 40% by weight which is obtained by chlorinating a polyolefin produced with a metallocene catalyst is mixed with a carboxyl-containing chlorinated polyolefin produced with a conventional titanium catalyst in a weight ratio of from 5/95 to 50/50 and this mixture is dissolved so as to result in a solid concentration of 10 to 50% by weight, then a binder resin solution composition which is inexpensive while retaining high performances can be obtained by suitably combining the polymers to be mixed. Thus, the problems described above are eliminated.

The invention provides the binder resin solution compositions shown below.

(1) A binder resin solution composition including:
  (a) a resin obtained by mixing
  a chlorinated polyolefin (I) obtained by chlorinating to a chlorine content of 10 to 40% by weight an isotactic polypropylene polymer produced in the presence of a metallocene catalyst, the isotactic polypropylene polymer having a molecular weight distribution of 3 or lower and a melting point as measured with a differential scanning calorimeter of 110 to 140° C.,
  with a carboxyl-containing chlorinated polyolefin (II) obtained by chlorinating to a chlorine content of 10 to 40% by weight a carboxyl-containing polyolefin obtained by grafting 1 to 10% by weight at least one unsaturated carboxylic acid monomer selected from a carboxylic acid and a carboxylic acid anhydride onto an isotactic polypropylene polymer produced with a titanium catalyst in a weight ratio (I)/(II) of from 5/95 to 50/50 ; and (b) an organic solvent, in which the composition has a solid concentration of 10 to 50% by weight.

(2) A binder resin solution composition including:

(a) a resin obtained by mixing a chlorinated polyolefin (I) obtained by chlorinating to a chlorine content of 10 to 40% by weight an isotactic polypropylene polymer produced in the presence of a metallocene catalyst, the isotactic polypropylene polymer having a molecular weight distribution of 3 or lower and a melting point as measured with a differential scanning calorimeter of 110 to 140° C., with a carboxyl-containing chlorinated polyolefin (II) obtained by grafting 1 to 10% by weight at least one unsaturated carboxylic acid monomer selected from a carboxylic acid and a carboxylic acid anhydride onto a chlorinated polyolefin obtained by chlorinating to a chlorine content of 10 to 40% by weight an isotactic polypropylene polymer produced with a titanium catalyst in a weight ratio (I)/(II) of from 5/95 to 50/50 ; and (b) an organic solvent, in which the composition has a solid concentration of 10 to 50% by weight.

(3) The binder resin solution composition according to (1) or (2), in which the isotactic polypropylene polymer produced in the presence of a metallocene catalyst is a propylene/α-olefin isotactic random copolymer.

(4) The binder resin solution composition according to (1) or (2), in which the isotactic polypropylene polymer produced in the presence of a metallocene catalyst is a propylene/ethylene isotactic random copolymer.

(5) The binder resin solution composition according to (1) or (2), in which the isotactic polypropylene polymer produced in the presence of a metallocene catalyst is isotactic polypropylene.

(6) A coating material for polyolefin films, sheets, or moldings, which includes the binder resin solution composition according to any one of (1) to (5) as an active ingredient.

(7) An ink for polyolefin films, sheets, or moldings, which includes the binder resin solution composition according to any one of (1) to (5) as an active ingredient.

(8) An adhesive for polyolefin films, sheets, or moldings, which includes the binder resin solution composition according to any one of (1) to (5) as an active ingredient.

(9) A primer for coating materials for polyolefin bumpers or the like, which includes the binder resin solution composition according to any one of (1) to (5).

Advantages of the Invention

The binder resin solutions of the invention show satisfactory low-temperature flowability and workability and have excellent adhesion to polyolefins and solvent resistance. Binder resin solution compositions which are inexpensive while retaining such high performances can be provided.

BEST MODE FOR CARRYING OUT THE INVENTION

The polyolefin produced with a metallocene catalyst and to be used as a raw material preferably has a molecular weight distribution (Mw/Mn) as determined by gel permeation chromatography (GPC) of 3 or lower and a melting point (Tm) as measured with a differential scanning calorimeter in the range of 110 to 140° C.

Examples of the polyolefin include polyethylene, polypropylene, poly(1-butene), and poly(4-methyl-1-pentene). Of these compounds, polypropylene is preferred.

As the polypropylene, a propylene homopolymer, a random copolymer of propylene and one or more other α-olefins, or the like may be mentioned. In the invention, a propylene/α-olefin random copolymer is especially preferred.

Examples of the α-olefins other than propylene include α-olefins having 2 or 4 to 20 carbon atoms, such as ethylene, 1-butene, 1-pentene, 1-hexene, 1-heptene, 1-octene, 1-decene, 1-dodecene, 1-hexadecene, and 4-methyl-1-pentene. Of these compounds, ethylene is preferred.

In a case where the α-olefin is ethylene, the propylene/α-olefin random copolymer which is preferably used in the invention may be as follows. The content therein of structural units derived from propylene is 85.7 to 98.5 mol % (90 to 99% by weight), preferably 88.5 to 97.0 mol % (92 to 98% by weight), more preferably 89.9 to 95.6 mol % (93 to 97% by weight). The content therein of structural units derived from ethylene is 1.5 to 14.3 mol % (1 to 10% by weight), preferably 3.0 to 11.5 mol % (2 to 8% by weight), more preferably 4.4 to 10.1 mol % (3 to 7% by weight).

The propylene/α-olefin random copolymer may have an intrinsic viscosity [η], as measured in 135° C. decalin, of 0.1-12 dL/g, preferably 0.3-10 dL/g, more preferably 0.5-5 dL/g.

The propylene/α-olefin random copolymer which is preferably used in the invention has a molecular weight distribution (Mw/Mn) as determined by gel permeation chromatography (GPC) of 3 or lower, preferably 1 to 2.7.

The propylene/α-olefin random copolymer which is preferably used in the invention has a melting point (Tm) as measured with a differential scanning calorimeter (DSC) of preferably 110 to 140° C., more preferably in the range of 120 to 135° C. This melting point is measured under the following conditions. About 5 mg of a sample is heated from room temperature to 240° C. at a heating rate of 30° C./min, held at 240° C. for 10 minutes, and then cooled to 30° C. at a cooling rate of 10° C./min. A peak temperature is taken as the melting point.

This resin can be produced with a metallocene catalyst so long as the resin is within a known range. Furthermore, the commercial ethylene/propylene random copolymer manufactured by Japan Polypropylene Corp. (trade name: Wintec) or the like may also be used.

On the other hand, the polyolefin produced with a conventional titanium catalyst may have a melt flow rate (ASTM 1238; 230° C.; 2.16-kg load) of 0.1 to 100 g/min, preferably 0.3 to 60 g/min. Examples of the polyolefin include polyethylene, polypropylene, poly(1-butene), and poly(4-methyl-1-pentene). Of these compounds, polypropylene is preferred in the invention. As the polypropylene, a propylene homopolymer, a random copolymer of propylene and one or more other α-olefins may be used.

Examples of the α-olefins other than propylene include α-olefins having 2 or 4 to 20 carbon atoms, such as ethylene, 1-butene, 1-pentene, 1-hexene, 1-heptene, 1-octene, 1-decene, 1-dodecene, 1-hexadecene, and 4-methyl-1-pentene. The content of propylene units is preferably 50 to 99 mol %. In a case where the content thereof is lower than 50 mol %, adhesion to polypropylene is poor.

The propylene/α-olefin random copolymer may have an intrinsic viscosity [η], as measured in 135° C. decalin, of 0.1 to 12 dL/g, preferably 0.3 to 10 dL/g, more preferably 0.5 to 5 dL/g.

The propylene homopolymer or propylene/α-olefin random copolymer which is preferably used in the invention may have a melt flow rate (ASTM 1238; 230° C.; 2.16-kg load) of 0.1 to 100 g/min, preferably 0.3 to 60 g/min.

This resin can be produced with a titanium catalyst so long as the resin is within a known range. Furthermore, use may be made of any of the commercial polypropylene, ethylene/propylene random copolymers, and ethylene/butene/propylene random copolymers manufactured by Mitsui Chemicals, Inc. (trade name: Mitsui Noblen), the commercial ethylene/propylene random copolymers manufactured by Sumitomo Chemical Co., Ltd. (trade name: Sumitomo Noblen), and the like.

The chlorinated polyolefin containing an isotactic polypropylene polymer produced in the presence of a metallocene catalyst, which is to be used in the invention, has a chlorine content of optimally 10 to 40% by weight. In a case where the chlorine content thereof is lower than 10% by weight, this polyolefin has poor solubility in solvents and satisfactory adhesion is not obtained. On the other hand, a chlorine content thereof higher than 40% by weight is undesirable because adhesion to polyolefins and solvent resistance are impaired.

Also in the carboxyl-containing chlorinated polyolefin which contains a carboxylic acid and/or a carboxylic acid anhydride and containes an isotactic polypropylene polymer produced with a conventional titanium catalyst, which is to be used in the invention, the optimal chlorine content is 10 to 40% by weight.

For graft-polymerizing an unsaturated carboxylic acid monomer with the polyolefin, known methods such as e.g., a method in which the polyolefin is melted by heating at a temperature not lower than the melting point thereof and reacted in the presence of a radical generator (melt process) and a method in which the polyolefin is dissolved in an organic solvent and then reacted with heating and stirring in the presence of a radical generator (solution process) may be employed.

In the melt process, a Banbury mixer, kneader, extruder, or the like is used for at a temperature of from the melting point to 300° C. This process hence has advantages that the operation is simple and that the reaction can be completed in a short time period. On the other hand, in the solution process, it is preferred to use an aromatic solvent such as toluene or xylene as a reaction solvent. Use may be made of a reaction temperature of 100 to 180° C. and a reaction period of from 1 hour to 5 hours. A feature of this process resides in that side reactions are less apt to occur and uniform graft polymerization products can be obtained.

Examples of the radical generator for use in the reaction include peroxides such as di-tert-butyl perphthalate, tert-butyl hydroperoxide, dicumyl peroxide, benzoyl peroxide, tert-butyl peroxybenzoate, tert-butyl peroxypivalate, methyl ethyl ketone peroxide, and di-tert-butyl peroxide and azonitriles such as azobisisobutyronitrile and azobisisopropionitrile.

Examples of the unsaturated carboxylic acid and/or anhydride thereof for use in the graft reaction include maleic acid, maleic anhydride, fumaric acid, citraconic acid, citraconic anhydride, mesaconic acid, itaconic acid, itaconic anhydride, aconitic acid, aconitic anhydride, and Himic anhydride.

The content of the unsaturated carboxylic acid and/or anhydride thereof is optimally 1 to 10% by weight. In a case where the content thereof is lower than 1%, this polyolefin gives a composition which has too low a polar-group content to have sufficient adhesiveness. In a case where the content thereof exceeds 10%, gelation occurs during chlorination.

For graft-polymerizing an unsaturated carboxylic acid and/or anhydride thereof with a chlorinated product of the polyolefin, this reaction may be conducted according to the solution process. However, the reaction temperature is preferably 60 to 120° C. Too low temperature is undesirable because the reaction proceeds slowly, while too high temperature is undesirable because the chlorinated polyolefin decomposes. The content of the unsaturated carboxylic acid and/or anhydride thereof is optimally 1 to 10% by weight. In a case where the content thereof is lower than 1%, this polyolefin gives a composition which has too low a polar-group content to have sufficient adhesiveness. In a case where the content thereof exceeds 10%, gelation occurs during reaction.

The chlorination of the polyolefin can be conducted by known methods. One example of processes for producing the chlorinated polyolefin is as follows. The polyolefin resin is dissolved and, optionally, modified by pyrolysis. This polyolefin resin dissolved is modified with an unsaturated carboxylic acid and/or anhydride thereof in the presence of a radical generator. The resin is then dissolved in a chlorination reaction solvent. Chlorine gas is bubbled into the solution at a temperature of 50 to 150° C. and ordinary or elevated pressure either in the presence of a catalyst or with ultraviolet irradiation to thereby react the resin. Thus, a chlorinated polyolefin can be obtained.

Examples of the radical generator for use in the chlorination reaction include peroxides such as tert-butyl peroxy-2-ethylhexanoate, di-tert-butyl peroxide, benzoyl peroxide, dicumyl peroxide, tert-butyl cumyl peroxide, dilauryl peroxide, tert-butyl hydroperoxide, cyclohexanone peroxide, tert-butyl peroxybenzoate, cumene hydroperoxide, and tert-butyl peroxyisobutyrate and azonitriles such as azobisisobutyronitrile and azobisisopropionitrile.

The chlorination reaction solvent for use in the invention may be a halogenated solvent such as a halogenated hydrocarbon or tetrachloroethylene. In particular, chloroform is preferred. In producing a binder resin solution of the invention, use may be made of a method in which the solution resulting from the chlorination reaction is evaporated to dryness and the residual chlorinated polyolefin is dissolved in a solvent or a method in which the chlorination reaction solvent is distilled off and replaced with a solvent.

Stabilizers for the chlorinated polyolefin for use in the invention preferably are epoxy compounds. In particular, a compound having one epoxy group per molecule and/or a resin thereof preferably has satisfactory compatibility with the chlorinated polyolefin and examples thereof include phenyl glycidyl ether, 2-methylphenyl glycidyl ether, tert-butylphenyl glycidyl ether, 4-chlorophenyl glycidyl ether, 4-methoxyphenyl glycidyl ether, 2-biphenyl glycidyl ether, 1-naphthyl glycidyl ether, methyl glycidyl ether, isopropyl glycidyl ether, butyl glycidyl ether, tert-butyl glycidyl ether, and 2-ethyl glycidyl ether. When one of these compounds or a mixture of two or more thereof is used, the effect is further enhanced.

The proportion of the chlorinated polyolefin to the compound having one epoxy group per molecule and/or resin thereof is desirably in the range of from 100:0.1 to 100:50 in terms of weight ratio. The reasons for this are as follows. In case where the proportion of the compound having one epoxy group per molecule and/or resin thereof is smaller than 0.1, stabilizing effect is insufficient. In case where the proportion thereof exceeds 50, adhesion to polyolefin resin moldings and films decreases.

The binder resin solution preferably has a solid concentration of 10 to 50% by weight. In a case where the solid concentration thereof is lower than 10% by weight, there are problems, for example, that it is difficult to disperse a pigment when an ink or coating material is prepared from the solution and that transportation cost increases. Solid concentration thereof exceeding 50% by weight is undesirable because this solution has poor low-temperature flowability and considerable limitations are imposed on handling at low temperature in winter.

The solvent to be used in the coating composition according to the invention most preferably is an aromatic organic solvent such as toluene or xylene. However, such an aromatic solvent may be also used as a mixture with one or more members selected from ester solvents such as ethyl acetate, propyl acetate, butyl acetate, and isobutyl acetate, ketone solvents such as acetone, methyl ethyl ketone, and methyl isobutyl ketone, alcohol solvents such as ethanol, 2-propanol, and diacetone alcohol, aliphatic solvents such as heptane and n-hexane, alicyclic solvents such as cyclohexane and methylcyclohexane, and cyclic ether solvents such as dioxane and tetrahydrofuran, so long as use of this mixture does not impair the solubility of the chlorinated polyolefin.

A feature of the invention is to provide a binder resin solution which retains the satisfactory adhesion of the lowly chlorinated polyolefin to polyolefins and is also inexpensive.

Compared to the production of a chlorinated polyolefin having a chlorine content of 10 to 40% by weight by chlorinating a polyolefin produced with a metallocene catalyst, the production of a carboxyl-containing chlorinated polyolefin essentially necessitates an unsaturated carboxylic acid monomer as a raw material and further requires a step for incorporating carboxyl groups. The carboxyl-containing chlorinated polyolefin hence has an increased cost.

The term "inexpensive" herein means that the cost of a binder resin can be reduced by mixing the carboxyl-containing chlorinated polyolefin, which has a high cost but has satisfactory adhesion, with the chlorinated polyolefin having a chlorine content of 10 to 40% by weight obtained through a smaller number of steps, i.e., obtained by chlorinating a polyolefin produced with an inexpensive metallocene catalyst, in such a proportion that the adhesion is maintained. Specifically, as a result of sufficient examinations of required performances and investigations on mixing proportions, it was found that as the proportion of the chlorinated polyolefin having a chlorine content of 10 to 40% by weight obtained by chlorinating a polyolefin produced with a metallocene catalyst is increased so long as the performances are maintained, the cost of the binder resin becomes lower as a matter of course.

The binder resin compositions of the invention can be used as a binder resin for a coating material, ink, adhesive, heat-sealing material, and the like for polyolefin films, sheets, moldings, etc. The compositions are usable also as a primer for coating materials for polyolefin bumpers.

Although the binder resin compositions of the invention may be applied as they are, they can be used as a coating material or ink prepared by adding a pigment, solvent, and other additives thereto and kneading the mixture to disperse the solid ingredients. Although the binder resins by themselves show well balanced coating-film properties, they may be used after a resin such as alkyd resin, acrylic resin, polyacrylic polyol, polyester resin, polyester polyol, polyether resin, polyether polyol, polyurethane resin, or chlorinated polyolefin is further added thereto according to the necessity.

EXAMPLES

The invention will be explained below in more detail by reference to the following Examples, but the invention should not be construed as being limited to the Examples in any way.

Production Example 1

Production of Polyolefin with Metallocene Catalyst 900 mL of hexane was added into an autoclave which has capacity of 2 L and had been sufficiently replaced the atmosphere with nitrogen. 1 milli-weight of triisobutylaluminum was added thereto, and the contents were heated to 70° C. Thereafter, propylene and ethylene were fed, and the total pressure was regulated to 0.7 MPa. Thereto were added 0.30 milli-weight of methylaluminoxane and 0.001 milli-weight, in terms of zirconium atom amount, of rac-dimethylsilylene-bis{1-(2-methyl-4-phenylindenyl)}zirconium dichloride. Propylene and ethylene were continuously fed and polymerized for 30 minutes while keeping the total pressure at 0.71 MPa. After the polymerization, the reaction mixture was degassed, and a propylene/ethylene random copolymer was recovered from a large amount of methanol. This copolymer was vacuum-dried at 110° C. for 12 hours.

Thus, a propylene/ethylene random copolymer having a melt flow rate (ASTM 1238; 230° C.; 2.16-kg load) of 10 g/10 min, ethylene content of 4.0 mol % (2.7% by weight), Mw/Mn of 2.5, and Tm of 131° C. was obtained. (Hereinafter, this copolymer is referred to as PE-1)

Production Example 2

Production of Polyolefin with Titanium Catalyst

An isotactic polypropylene polymer was produced by using a titanium catalyst according to the method in Production Example 1. Thus, an isotactic polypropylene having a melt flow rate (ASTM 1238; 230° C.; 2.16-kg load) of 0.6 g/10 min, Mw/Mn of 5.4, and Tm of 165° C. was obtained (hereinafter referred to as PP-1).

Production Example 3

Production of Polyolefin with Titanium Catalyst

An isotactic polypropylene polymer was produced by using a titanium catalyst according to the method in Production Example 1. Thus, a propylene/ethylene random copolymer (ethylene content, 5.9 mol % (4.0% by weight)) having a melt flow rate (ASTM 1238; 230° C.; 2.16-kg load) of 55 g/10 min, Mw/Mn of 4.6, and Tm of 135° C. was obtained (hereinafter referred to as PE-2).

Production Example 4

Production of Polyolefin with Titanium Catalyst

An isotactic polypropylene polymer was produced by using a titanium catalyst according to the method employed in Production Example 1. Thus, an ethylene/propylene/butene random terpolymer (ethylene content, 4.0 mol % (2.7% by weight); butene content, 2.5 mol% (3.3% by weight)) having a melt flow rate (ASTM 1238; 230° C.; 2.16-kg load) of 3.6 g/10 min, Mw/Mn of 3.5, and Tm of 130° C. was obtained (hereinafter referred to as PEB-1).

Production Example 5

Production of Chlorinated Polyolefin Containing Polyolefins Produced with Metallocene Catalyst 280 g of the PE-1 and 2,520 g of chloroform were added into an autoclave equipped with a stirrer. The atmosphere in the autoclave was replaced with nitrogen for about 5 minutes. Thereafter, the contents were heated to 110° C. to sufficiently dissolve the resin. Subsequently, 1.4 g of tert-butyl peroxy-2-ethylhexanoate was added thereto, and chlorine gas was bubbled into the reaction mixture. 3 liquid reaction mixtures differing in chlorine content were taken out. The chloroform as a reaction solvent was distilled off under reduced pressure, and toluene was then added to each residue to dissolve it. Thus, toluene solutions of chlorinated polyolefins respectively having chlorine contents of 15% by weight, 20% by weight, and 25% by weight were obtained which each had a solid content of 20% by weight (hereinafter referred to as PE-1-15, PE-1-20, and PE-1-25). Phenyl glycidyl ether (trade name, Denacol EX-141; manufactured by Nagase ChemteX Corp.) was added as a stabilizer in an amount of 3% by weight based on the resin. The results of various analyses are shown in Table 1.

Production Example 6

Production of Carboxyl-Containing Chlorinated Polyolefins containing Polyolefin Produced with Titanium Catalyst 280 g of PP-1, 16.8 g of maleic anhydride, 5.6 g of di-tert-butyl peroxide, and 420 g of toluene were added into an autoclave equipped with a stirrer. The atmosphere in the autoclave was replaced with nitrogen for about 5 minutes. Thereafter, the reaction mixture was reacted for 5 hours with heating at 140° C. and stirring. After completion of the reaction, the liquid reaction mixture was poured into a large amount of methyl ethyl ketone to precipitate a resin. This resin was further washed with methyl ethyl ketone several times to remove the maleic anhydride remaining unreacted. This resin was vacuum-dried to obtain a maleic-anhydride-modified polypropylene. The modified polypropylene was subjected to a chlorination reaction according to the method in Production Example 5. Thus, toluene solutions of maleic-anhydride-modified chlorinated polyolefins respectively having chlorine contents of 15% by weight, 20% by weight, and 25% by weight were obtained which each had a solid content of 20% by weight (hereinafter referred to as PP-1-15, PP-1-20, and PP-1-25). Phenyl glycidyl ether (trade name, Denacol EX-141; manufactured by Nagase ChemteX Corp.) was added as a stabilizer in an amount of 3% by weight based on the resin. The results of various analyses are shown in Table 1.

Production Example 7

Production of Carboxyl-Containing Chlorinated Polyolefins containing Polyolefin Produced with Titanium Catalyst PE-2 was reacted according to the method in Production Example 6. Thus, toluene solutions of maleic-anhydride-modified chlorinated polypropylenes respectively having chlorine contents of 15% by weight, 20% by weight, and 25% by weight were obtained which each had a solid content of 20% by weight (hereinafter referred to as PE-2-15, PE-2-20, and PE-2-25). Phenyl glycidyl ether (trade name, Denacol EX-141; manufactured by Nagase ChemteX Corp.) was added as a stabilizer in an amount of 3% by weight based on the resin. The results of various analyses are shown in Table 1.

Production Example 8

Production of Carboxyl-Containing Chlorinated Polyolefins Containing Polyolefin Produced with Titanium Catalyst PEB-1 was reacted according to the method in Production Example 6. Thus, toluene solutions of maleic-anhydride-modified chlorinated polyolefins respectively having chlorine contents of 15% by weight, 20% by weight, and 25% by weight were obtained which each had a solid content of 20% by weight (hereinafter referred to as PEB-1-15, PEB-1-20, and PEB-1-25). Phenyl glycidyl ether (trade name, Denacol EX-141; manufactured by Nagase ChemteX Corp.) was added as a stabilizer in an amount of 3% by weight based on the resin.

The results of various analyses are shown in Table 1.

TABLE 1

Analytical Values for Chlorinated Polyolefin and Carboxyl-Containing Chlorinated Polyolefins of Production Examples 5 to 8

| | PE-1-15 | PE-1-20 | PE-1-25 | PP-1-15 | PP-1-20 | PP-1-25 | PE-2-15 | PE-2-20 | PE-2-25 | PEB-1-15 | PEB-1-20 | PEB-1-25 |
|---|---|---|---|---|---|---|---|---|---|---|---|---|
| Chlorine content (wt %) | 15.3 | 20.1 | 25.8 | 15.1 | 19.9 | 25.3 | 14.8 | 20.0 | 25.3 | 15.5 | 19.9 | 25.4 |
| Malic anhydride content (wt %) | — | — | — | 2.8 | 2.3 | 2.3 | 1.8 | 1.5 | 1.9 | 1.6 | 1.9 | 1.6 |
| Weight-average molecular weight | 98000 | 101000 | 102000 | 186000 | 190000 | 190000 | 98000 | 102000 | 103000 | 58000 | 60000 | 61000 |
| Tm (° C.) | 65 | 60 | nil | 88, 105 | 85, 105 | 85 | 75, 100 | 73 | nil | 72, 98 | 70 | nil |

In Table 1, the values of chlorine content and maleic anhydride content are based on the nonvolatile component. The values of weight-average molecular weight are results of analysis by gel permeation chromatography using standard polystyrene. The values of Tm are results of DSC examination; when two peaks were present, both the two values are shown. When no peak was observed, this case is indicated by "nil".

Example 1

PE-1-15, PE-1-20, and PE-1-25 each were mixed with each of PP-1-15, PP-1-20, and PP-1-25 in proportions of 90/10, 75/25, and 50/50 in terms of nonvolatile-component ratio by weight.

Example 2

PE-1-15, PE-1-20, and PE-1-25 each were mixed with each of PE-2-15, PE-2-20, and PE-2-25 in proportions of 90/10, 75/25, and 50/50 in terms of nonvolatile-component ratio by weight.

Example 3

PE-1-15, PE-1-20, and PE-1-25 each were mixed with each of PEB-1-15, PEB-1-20, and PEB-1-25 in proportions of 90/10, 75/25, and 50/50 in terms of nonvolatile-component ratio by weight.

Comparative Example 1

PE-1-15, PE-1-20, and PE-1-25 are used, respectively.

Comparative Example 2

PP-1-15, PP-1-20, and PP-1-25 are used, respectively.

Comparative Example 3

PE-2-15, PE-2-20, and PE-2-25 are used, respectively.

Comparative Example 4

PEB-1-15, PEB-1-20, and PEB-1-25 are used, respectively.

Low-Temperature Flowability:

The binder resin solutions obtained in Examples 1, 2, and 3 and Comparative Examples 1 to 4 were stored for 10 days in each of 5° C., −5° C., and −10° C. atmospheres. The solution state (low-temperature flowability) of each chlorinated-polyolefin solution is shown in Tables 2 and 3. In the tables, "good" indicates "flowable", and "poor" indicates "not flowable (gelled)".

Gasoline Resistance:

Of the binder resin solutions obtained in Examples 1, 2, and 3 and Comparative Examples 1 to 4, those which showed satisfactory low-temperature flowability in −5° C. storage as shown in Tables 2 and 3 were evaluated in the following manner. Each binder resin solution was subjected to viscosity adjustment with toluene to 12 sec/20° C. in terms of Ford cup #4 viscosity. This resin solution was applied by spraying to a polypropylene plate (one obtained by press-molding Mitsui Noblen SB-E3 in an ordinary manner; 100 mm×50 mm; thickness, 2 mm) cleaned with isopropyl alcohol, and was then dried at 80° C. for 10 minutes. Subsequently, a two-pack type curable urethane coating material was applied thereto by spraying in such an amount as to result in a film thickness of 50 to 60 g/m², thereafter dried at room temperature for about 10 minutes, and then dried at 80° C. for 45 minutes. The resultant test piece was returned to room temperature and tested after 24 hours. Scratches reaching the base were formed in the coating of the coated polypropylene plate. This coated plate was immersed for 2 hours in regular gasoline kept at 20° C., and the state of the coating film was then examined. The results are shown in Table 4.

Adhesion between Layers:

Of the binder resin solutions obtained in Examples 1, 2, and 3 and Comparative Examples 1 to 4, those which showed satisfactory low-temperature flowability in −5° C. storage as shown in Table 1 were evaluated in the following manner. Each binder solution was applied to a polypropylene plate by the above-mentioned method. This coating was crosshatchwise incised at intervals of 1 mm at a depth reaching the base to make 100 squares. A cellophane tape was press-bonded to the incised surface and peeled off at an angle of 90° with the coating surface. The number of remaining squares was counted. The results are shown in Table 4.

Adhesion between Layers after Immersion in Warm Water:

Of the solutions obtained in Examples 1, 2, and 3 and Comparative Examples 1 to 4, those which showed satisfactory low-temperature flowability in −5° C. storage as shown in Tables 2 and 3 were evaluated in the following manner. Each binder solution was applied to a polypropylene plate by the above-mentioned method. This coated polypropylene plate was immersed for 240 hours in warm water kept at 40° C. and was then evaluated in the same manner as shown above. The results are shown in Table 4.

Gasohol Resistance:

Of the binder resin solutions obtained in Examples 1, 2, and 3 and Comparative Examples 1 to 4, those which showed satisfactory low-temperature flowability in −5° C. storage as shown in Tables 2 and 3 were evaluated in the following manner. Each binder solution was applied to a polypropylene plate by the above-mentioned method. This coated polypropylene plate was immersed for 120 minutes in gasohol (regular gasoline/ethanol=90/10 (by weight)) kept at 20° C., and the state of the coating film was then examined. The results are shown in Table 4.

TABLE 2

| | Production Example 5 A | Production Examples 6 to 8 B | A/B Ratio (nonvolatile-component ratio) | Low-temperature flowability 5° C. | −5° C. | −10° C. |
|---|---|---|---|---|---|---|
| Example 1 | PE-1-15 | PP-1-15 | 10/90 | poor | poor | poor |
| | | | 25/75 | poor | poor | poor |
| | | | 50/50 | poor | poor | poor |
| | | PP-1-20 | 10/90 | poor | poor | poor |
| | | | 25/75 | poor | poor | poor |
| | | | 50/50 | poor | poor | poor |
| | | PP-1-25 | 10/90 | good | poor | poor |
| | | | 25/75 | poor | poor | poor |
| | | | 50/50 | poor | poor | poor |
| | PE-1-20 | PP-1-15 | 10/90 | poor | poor | poor |
| | | | 25/75 | poor | poor | poor |
| | | | 50/50 | poor | poor | poor |
| | | PP-1-20 | 10/90 | poor | poor | poor |
| | | | 25/75 | poor | poor | poor |
| | | | 50/50 | good | poor | poor |
| | | PP-1-25 | 10/90 | good | poor | poor |
| | | | 25/75 | good | poor | poor |
| | | | 50/50 | good | good | poor |
| | PE-1-25 | PP-1-15 | 10/90 | poor | poor | poor |
| | | | 25/75 | poor | poor | poor |
| | | | 50/50 | poor | poor | poor |
| | | PP-1-20 | 10/90 | poor | poor | poor |
| | | | 25/75 | poor | poor | poor |
| | | | 50/50 | good | poor | poor |
| | | PP-1-25 | 10/90 | good | poor | poor |
| | | | 25/75 | good | good | poor |
| | | | 50/50 | good | good | poor |
| Example 2 | PE-1-15 | PE-2-15 | 10/90 | poor | poor | poor |
| | | | 25/75 | poor | poor | poor |
| | | | 50/50 | poor | poor | poor |
| | | PE-2-20 | 10/90 | good | poor | poor |
| | | | 25/75 | good | poor | poor |
| | | | 50/50 | poor | poor | poor |
| | | PE-2-25 | 10/90 | good | poor | poor |
| | | | 25/75 | good | poor | poor |
| | | | 50/50 | good | poor | poor |

TABLE 2-continued

| Production Example 5 A | Production Examples 6 to 8 B | A/B Ratio (nonvolatile-component ratio) | Low-temperature flowability 5° C. | -5° C. | -10° C. |
|---|---|---|---|---|---|
| PE-1-20 | PE-2-15 | 10/90 | poor | poor | poor |
| | | 25/75 | poor | poor | poor |
| | | 50/50 | good | poor | poor |
| | PE-2-20 | 10/90 | good | poor | poor |
| | | 25/75 | good | good | poor |
| | | 50/50 | good | good | poor |
| | PE-2-25 | 10/90 | good | good | poor |
| | | 25/75 | good | good | poor |
| | | 50/50 | good | good | poor |
| PE-1-25 | PE-2-15 | 10/90 | poor | poor | poor |
| | | 25/75 | poor | poor | poor |
| | | 50/50 | good | poor | poor |
| | PE-2-20 | 10/90 | good | poor | poor |
| | | 25/75 | good | good | poor |
| | | 50/50 | good | good | poor |
| | PE-2-25 | 10/90 | good | good | poor |
| | | 25/75 | good | good | poor |
| | | 50/50 | good | good | poor |

TABLE 3

| | Production Example 5 A | Production Examples 6 to 8 B | A/B Ratio (nonvolatile-component ratio) | Low-temperature flowability 5° C. | -5° C. | -10° C. |
|---|---|---|---|---|---|---|
| Example 3 | PE-1-15 | PEB-1-15 | 10/90 | poor | poor | poor |
| | | | 25/75 | poor | poor | poor |
| | | | 50/50 | poor | poor | poor |
| | | PEB-1-20 | 10/90 | good | poor | poor |
| | | | 25/75 | good | poor | poor |
| | | | 50/50 | good | poor | poor |
| | | PEB-1-25 | 10/90 | good | poor | poor |
| | | | 25/75 | poor | poor | poor |
| | | | 50/50 | poor | poor | poor |

TABLE 3-continued

| | Production Example 5 A | Production Examples 6 to 8 B | A/B Ratio (nonvolatile-component ratio) | Low-temperature flowability 5° C. | -5° C. | -10° C. |
|---|---|---|---|---|---|---|
| | PE-1-20 | PEB-1-15 | 10/90 | poor | poor | poor |
| | | | 25/75 | poor | poor | poor |
| | | | 50/50 | good | poor | poor |
| | | PEB-1-20 | 10/90 | good | good | poor |
| | | | 25/75 | good | good | poor |
| | | | 50/50 | good | good | poor |
| | | PEB-1-25 | 10/90 | good | good | poor |
| | | | 25/75 | good | good | poor |
| | | | 50/50 | good | good | poor |
| | PE-1-25 | PEB-1-15 | 10/90 | poor | poor | poor |
| | | | 25/75 | poor | poor | poor |
| | | | 50/50 | good | poor | poor |
| | | PEB-1-20 | 10/90 | good | good | poor |
| | | | 25/75 | good | good | poor |
| | | | 50/50 | good | good | poor |
| | | PEB-1-25 | 10/90 | good | good | poor |
| | | | 25/75 | good | good | poor |
| | | | 50/50 | good | good | good |
| Comparative Example 1 | PE-1-15 PE-1-20 PE-1-25 | — | 100/0 100/0 100/0 | good good good | poor good good | poor poor good |
| Comparative Example 2 | PP-1-15 PP-1-20 PP-1-25 | — | 100/0 100/0 100/0 | poor poor good | poor poor poor | poor poor poor |
| Comparative Example 3 | PE-2-15 PE-2-20 PE-2-25 | — | 100/0 100/0 100/0 | poor good good | poor poor good | poor poor poor |
| Comparative Example 4 | PEB-1-15 PEB-1-20 PEB-1-25 | — | 100/0 100/0 100/0 | poor good good | poor good good | poor poor poor |

TABLE 4

Results of Coating Film Performance Tests of Chlorinated Polyolefins

| | Production Example 5 | Production Examples 6-8 | (ProductionExample 5)/ (ProductionExample 6-8) ratio (nonvolatile-component ratio) | Adhesion between layers | Adhesion between layers after immersion in warm water | Gasoline resistance | Gasohol resistance |
|---|---|---|---|---|---|---|---|
| Example 1 | PE-1-20 | PP-1-25 | 50/50 | 75 | 70 | peeling occurred | peeling occurred |
| | PE-1-25 | PP-1-25 | 25/75 | 75 | 70 | peeling occurred | peeling occurred |
| | | | 50/50 | 100 | 100 | peeling occurred | peeling occurred |
| Example 2 | PE-1-20 | PE-2-20 | 25/75 | 100 | 100 | no peeling | no peeling |
| | | | 50/50 | 100 | 100 | no peeling | peeling occurred |
| | | PE-2-25 | 10/90 | 100 | 100 | peeling occurred | peeling occurred |
| | | | 25/75 | 100 | 100 | peeling occurred | peeling occurred |
| | | | 50/50 | 100 | 100 | peeling occurred | peeling occurred |
| | PE-1-25 | PE-2-20 | 25/75 | 100 | 100 | no peeling | no peeling |
| | | | 50/50 | 100 | 100 | no peeling | peeling occurred |

TABLE 4-continued

Results of Coating Film Performance Tests of Chlorinated Polyolefins

| | Production Example 5 | Production Examples 6 to 8 | (ProductionExample 5)/ (ProductionExample 6-8) ratio (nonvolatile-component ratio) | Adhesion between layers | Adhesion between layers after immersion in warm water | Gasoline resistance | Gasohol resistance |
|---|---|---|---|---|---|---|---|
| | | PE-2-25 | 10/90 | 100 | 100 | peeling occurred | peeling occurred |
| | | | 25/75 | 100 | 100 | peeling occurred | peeling occurred |
| | | | 50/50 | 100 | 100 | peeling occurred | peeling occurred |
| Example 3 | PE-1-20 | PEB-1-20 | 10/90 | 100 | 100 | no peeling | peeling occurred |
| | | PEB-1-20 | 25/75 | 100 | 100 | no peeling | no peeling |
| | | | 50/50 | 100 | 100 | no peeling | no peeling |
| | | PEB-1-25 | 10/90 | 100 | 100 | peeling occurred | peeling occurred |
| | | | 25/75 | 100 | 100 | peeling occurred | peeling occurred |
| | | | 50/50 | 100 | 100 | peeling occurred | peeling occurred |
| | PE-1-25 | PEB-1-20 | 10/90 | 100 | 100 | no peeling | peeling occurred |
| | | PEB-1-20 | 25/75 | 100 | 100 | no peeling | no peeling |
| | | | 50/50 | 100 | 100 | no peeling | no peeling |
| | | PEB-1-25 | 10/90 | 100 | 100 | peeling occurred | peeling occurred |
| | | | 25/75 | 100 | 100 | peeling occurred | peeling occurred |
| | | | 50/50 | 100 | 100 | peeling occurred | peeling occurred |
| Comparative Example 1 | PE-1-15 | — | 100/0 | 100 | 100 | no peeling | peeling occurred |
| | PE-1-20 | — | 100/0 | 100 | 100 | no peeling | peeling occurred |
| | PE-1-25 | — | 100/0 | 100 | 100 | no peeling | peeling occurred |
| Comparative Example 2 | PP-1-15 | — | 100/0 | 80 | 80 | no peeling | no peeling |
| | PP-1-20 | — | 100/0 | 75 | 75 | no peeling | no peeling |
| | PP-1-25 | — | 100/0 | 50 | 60 | peeling occurred | peeling occurred |
| Comparative Example 3 | PE-2-15 | — | 100/0 | 100 | 100 | no peeling | no peeling |
| | PE-2-20 | — | 100/0 | 100 | 100 | no peeling | no peeling |
| | PE-2-25 | — | 100/0 | 75 | 75 | peeling occurred | peeling occurred |
| Comparative Example 4 | PEB-1-15 | — | 100/0 | 100 | 100 | no peeling | no peeling |
| | PEB-1-20 | — | 100/0 | 100 | 100 | no peeling | no peeling |
| | PEB-1-25 | — | 100/0 | 75 | 70 | peeling occurred | peeling occurred |

The following can be seen from the results given in Table 2 and Table 3. Low-temperature flowability is improved by mixing any of the chlorinated polyolefins obtained by chlorinating a polyolefin produced with a metallocene catalyst (Comparative Example 1) with any of the carboxyl-containing chlorinated polyolefins produced with a conventional titanium catalyst (Comparative Examples 2 to 4). In particular, when the chlorinated polyolefin obtained by chlorinating a polyolefin produced with a metallocene catalyst has a high chlorine content and has been incorporated in a large amount, then the effect of improving low-temperature flowability is high. In this case, the binder resin cost is lower.

The following can be seen from the results given in Table 4. There are cases where the results of coating film performance tests are improved by mixing any of the chlorinated polyolefins obtained by chlorinating a polyolefin produced with a metallocene catalyst (Comparative Example 1) with any of the carboxyl-containing chlorinated polyolefins produced with a conventional titanium catalyst (Comparative Examples 2 to 4). In Example 2 and Example 3, there are many cases where the results are satisfactory. Especially in Example 3, even when the chlorinated polyolefin obtained by chlorinating a polyolefin produced with a metallocene catalyst has been incorporated in a large amount, the results of coating film performance tests are satisfactory. In this case, the binder resin cost is lower.

The results given above show that the binder resin compositions of the invention have satisfactory low-temperature flowability and coating film performances and have a lower cost. The compositions hence proved to be exceedingly useful.

The invention claimed is:
1. A binder resin solution composition comprising:
(a) a resin obtained by mixing a chlorinated polyolefin (I) obtained by chlorinating to a chlorine content of 10 to 40% by weight an isotactic polypropylene polymer produced in the presence of a metallocene catalyst, said isotactic polypropylene polymer having a molecular weight distribution of 3 or lower and a melting point as measured with a differential scanning calorimeter of 110 to 140° C., with a carboxyl-containing chlorinated polyolefin (II) obtained by chlorinating to a chlorine content of 10 to 40% by weight a carboxyl-containing polyolefin obtained by grafting 1 to 10% by weight at least one unsaturated carboxylic acid monomer selected from a carboxylic acid and a carboxylic acid anhydride onto an isotactic polypropylene polymer produced with a titanium catalyst in a weight ratio (I)/(II) of from 5/95 to 50/50; and (b) an organic solvent, wherein said composition has a solid concentration of 10 to 50% by weight.

2. A binder resin solution composition comprising:

(a) a resin obtained by mixing a chlorinated polyolefin (I) obtained by chlorinating to a chlorine content of 10 to 40% by weight an isotactic polypropylene polymer produced in the presence of a metallocene catalyst, said isotactic polypropylene polymer having a molecular weight distribution of 3 or lower and a melting point as measured with a differential scanning calorimeter of 110 to 140° C.

with a carboxyl-containing chlorinated polyolefin (II) obtained by grafting 1 to 10% by weight at least one unsaturated carboxylic acid monomer selected from a carboxylic acid and a carboxylic acid anhydride onto a chlorinated polyolefin obtained by chlorinating to a chlorine content of 10 to 40% by weight an isotactic polypropylene polymer produced with a titanium catalyst in a weight ratio (I)/(II) of from 5/95 to 50/50; and (b) an organic solvent, wherein said composition has a solid concentration of 10 to 50% by weight.

3. The binder resin solution composition according to claim 1, wherein the isotactic polypropylene polymer produced in the presence of a metallocene catalyst is a propylene/a-olefin isotactic random copolymer.

4. The binder resin solution composition according to claim 1, wherein the isotactic polypropylene polymer produced in the presence of a metallocene catalyst is a propylene/ethylene isotactic random copolymer.

5. The binder resin solution composition according to claim 1, wherein the isotactic polypropylene polymer produced in the presence of a metallocene catalyst is isotactic polypropylene.

6. A coating material for polyolefin films, sheets, or moldings, which comprises the binder resin solution composition according to claim 1 as an active ingredient.

7. An ink for polyolefin films, sheets, or moldings, which comprises the binder resin solution composition according to claim 1 as an active ingredient.

8. An adhesive for polyolefin films, sheets, or moldings, which comprises the binder resin solution composition according to claim 1 as an active ingredient.

9. A primer for coating materials for polyolefin bumpers or the like, which comprises the binder resin solution composition according to claim 1.

10. The binder resin solution composition according to claim 2, wherein the isotactic polypropylene polymer produced in the presence of a metallocene catalyst is a propylene/a-olefin isotactic random copolymer.

11. The binder resin solution composition according to claim 2, wherein the isotactic polypropylene polymer produced in the presence of a metallocene catalyst is a propylene/ethylene isotactic random copolymer.

12. The binder resin solution composition according to claim 2, wherein the isotactic polypropylene polymer produced in the presence of a metallocene catalyst is isotactic polypropylene.

13. A coating material for polyolefin films, sheets, or moldings, which comprises the binder resin solution composition according to claim 2 as an active ingredient.

14. An ink for polyolefin films, sheets, or moldings, which comprises the binder resin solution composition according to claim 2 as an active ingredient.

15. An adhesive for polyolefin films, sheets, or moldings, which comprises the binder resin solution composition according to claim 2 as an active ingredient.

16. A primer for coating materials for polyolefin bumpers or the like, which comprises the binder resin solution composition according to claim 2.

* * * * *